United States Patent [19]
Coffman et al.

[11] 3,762,071
[45] Oct. 2, 1973

[54] TEACHING AID
[76] Inventors: Benjamin F. Coffman; Muriel F. Coffman, both of 1630 S. Barranca, Sp 7, Glendora, Calif. 91740
[22] Filed: May 17, 1972
[21] Appl. No.: 254,254

[52] U.S. Cl. .................................. 35/35 F, 35/74
[51] Int. Cl. ..................... G09b 1/22, G09b 17/00
[58] Field of Search .............. 35/35 F, 31 A, 74; 40/70

[56]     References Cited
         UNITED STATES PATENTS

| | | | |
|---|---|---|---|
| 3,071,322 | 1/1963 | Harris | 35/74 |
| 916,563 | 3/1909 | Kristofek | 35/74 UX |
| 784,660 | 3/1905 | Chritton | 35/31 A UX |
| 1,329,896 | 2/1920 | Frome | 35/74 |
| 3,200,517 | 8/1965 | D'Agostino | 35/35 F |
| 3,199,227 | 8/1965 | King | 35/35 F |
| 2,520,347 | 8/1950 | Talcott | 35/74 UX |
| 1,267,326 | 5/1918 | Kuhn | 35/31 A UX |
| 1,833,793 | 11/1931 | Pfleger | 35/74 |
| 375,095 | 12/1887 | Pollard | 35/74 |

*Primary Examiner*—Wm. H. Grieb
*Attorney*—Boniard I. Brown

[57]            ABSTRACT

A teaching aid having a plurality of concentric discs mounted face to face behind a face plate for independent rotation on their common axis to different angular positions for exposing, through windows in the face plate and all but the rearmost disc, generally radial rows of characters with the exposed character rows parallel to one another and the corresponding characters in the exposed rows aligned laterally of the rows to form a large number of different character combinations readable laterally of the exposed rows. The described teaching aid is a phonics teaching aid in which the characters are vowels and consonants for forming different phonetic combinations.

5 Claims, 6 Drawing Figures

PATENTED OCT 2 1973 3,762,071

TEACHING AID

BACKGROUND OF THE INVENTION

1. Field of the Invention

This invention relates generally to the field of child education and more particularly to a novel teaching aid.

2. Discussion of the Prior Art

As will appear from the ensuing description, the teaching aid of the invention may be used for a variety of teaching applications. Its primary application, however, is teaching phonics. For this reason, the teaching aid will be described in connection with its use as a phonetic teaching aid.

As is well known to those versed in the field of child education, phonics is the method of teaching young children to read and pronounce words by learning the phonetic value of the letters of the alphabet, letter groups, and syllables.

Phonics was taught in the past by presenting large columns of words to each child, who was told to study the columns. Since children are easily distracted, such columns were confusing to them. Moreover, the dry book of words that was used had a bad psychological impact making the child think the exercise a chore rather than fun.

A variety of phonetic teaching aids have been devised to avoid the above and other disadvantages of using large word columns. One such phonetic teaching aid, for example, is described in U.S. Pat. No. 3,199,227.

SUMMARY OF THE INVENTION

The present invention provides a novel teaching aid, the described embodiment of which is a phonetic teaching aid. This teaching aid has a plurality of concentric discs rotatably mounted behind a face plate in close face to face relation to one another and the face plate. The discs are independently rotatable on their common axis for exposing, through windows in the face plate and all but the rearmost disc, generally radial rows of characters imprinted or otherwise provided on the discs. According to an important feature of the invention, the character rows are uniquely arranged on the discs in a manner such that the exposed rows are disposed in parallel side by side relation with the corresponding characters in the exposed rows aligned laterally of the rows to form a variety of character combinations readable laterally of the rows. The discs have progressively larger diameters from the front to the rear discs, and the face plate has an opening through which the edge portions or peripheries of the discs are exposed to permit rotation of the individual discs. In the described embodiment, a rear plate behind the discs is secured to the face plate in such a way as to form an enclosed space containing the discs.

As noted earlier, the teaching aid may be utilized for various teaching applications. For example, U.S. Pat. Nos. 1,329,896 and 1,833,793 disclose two possible teaching applications to which the teaching aid may conceivably be adapted. The characters on the discs, of course, will be selected in accordance with the particular teaching application for which the teaching aid is to be employed. The described teaching aid is designed for teaching phonics. In this case, the characters on the discs are vowels and consonants for forming a variety of phonetic combinations.

DESCRIPTION OF THE PREFERRED EMBODIMENT

Figure 1:
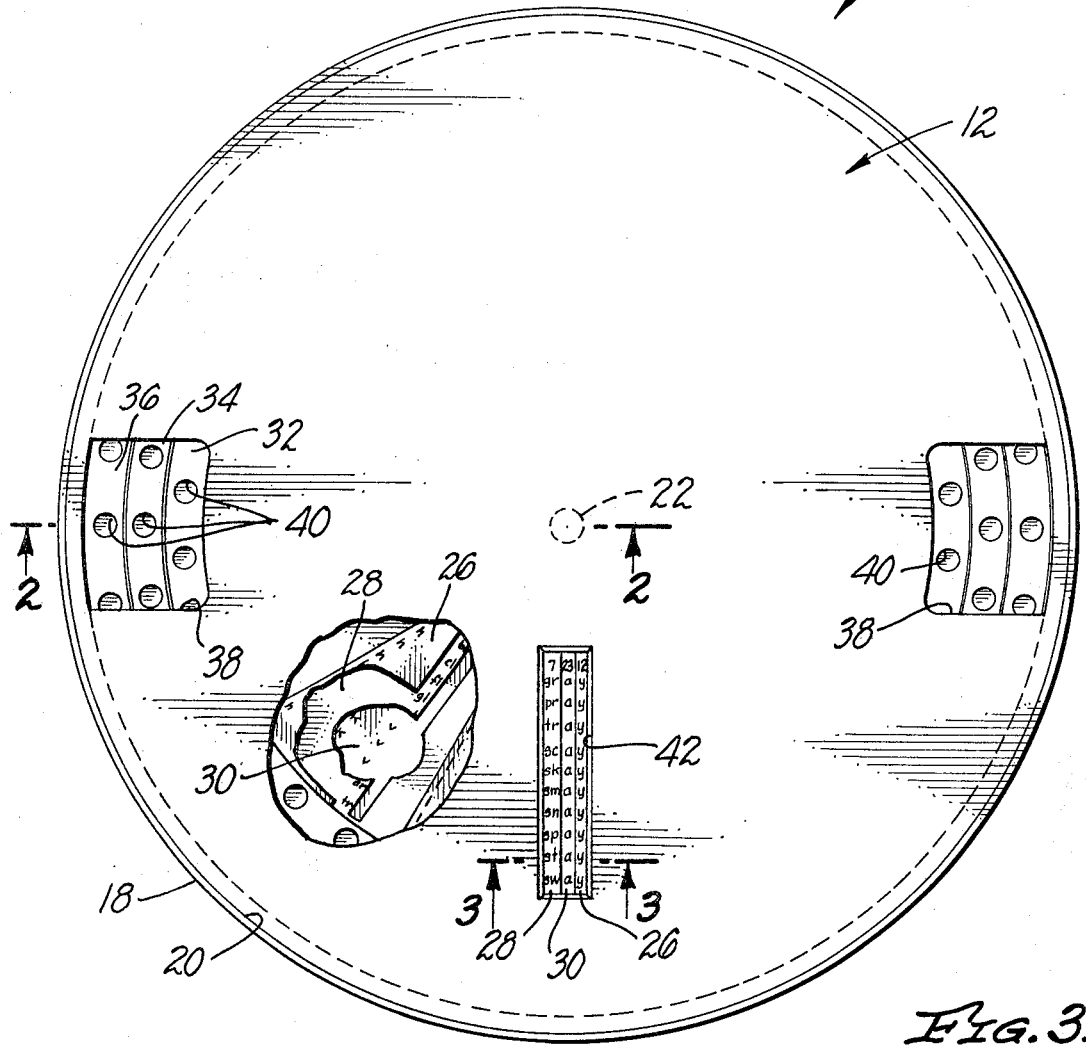
FIG. 1 is a face view of a phonetic teaching aid according to the invention with parts broken away for the sake of clarity.
Figure 3:
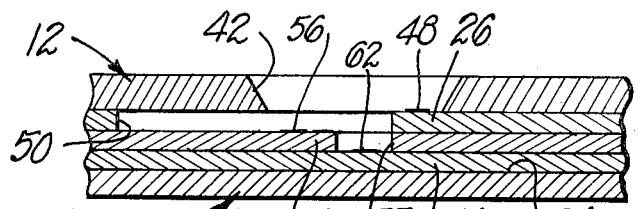
FIG. 3 is an enlarged section taken on line 3—3 in FIG. 1.

The illustrated teaching aid 10 has an opaque face plate 12 and rear plate 14 of circular shape. Face plate 12 has a concentric circular boss 16 projecting from its rear side. Rear plate 14 has a forwardly projecting cylindrical shoulder 18 about its edge. The annular front face of this shoulder is recessed at 20 to seat the edge portion or periphery of the face plate 12. The face plate may be adhesively bonded or otherwise secured to the shoulder. Projecting from the confronting inner faces of the face plate and rear plate along the common central axis of the plates are interfitting posts forming a cylindrical pivot 22.

Face plate 12 and rear plate 14 define therebetween a relatively narrow circular space 24 containing a plurality, in this instance three, of opaque concentric discs 26, 28 and 30. These discs are disposed in close, and more precisely contacting, face to face relation to one another and to the plates 12, 14, and are centrally apertured to receive and rotate independently on the pivot 22.

Figure 2:
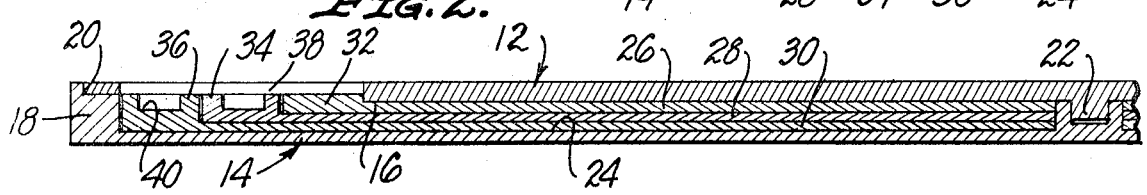
FIG. 2 is an enlarged section taken on line 2—2 in FIG. 1.
Figure 4:
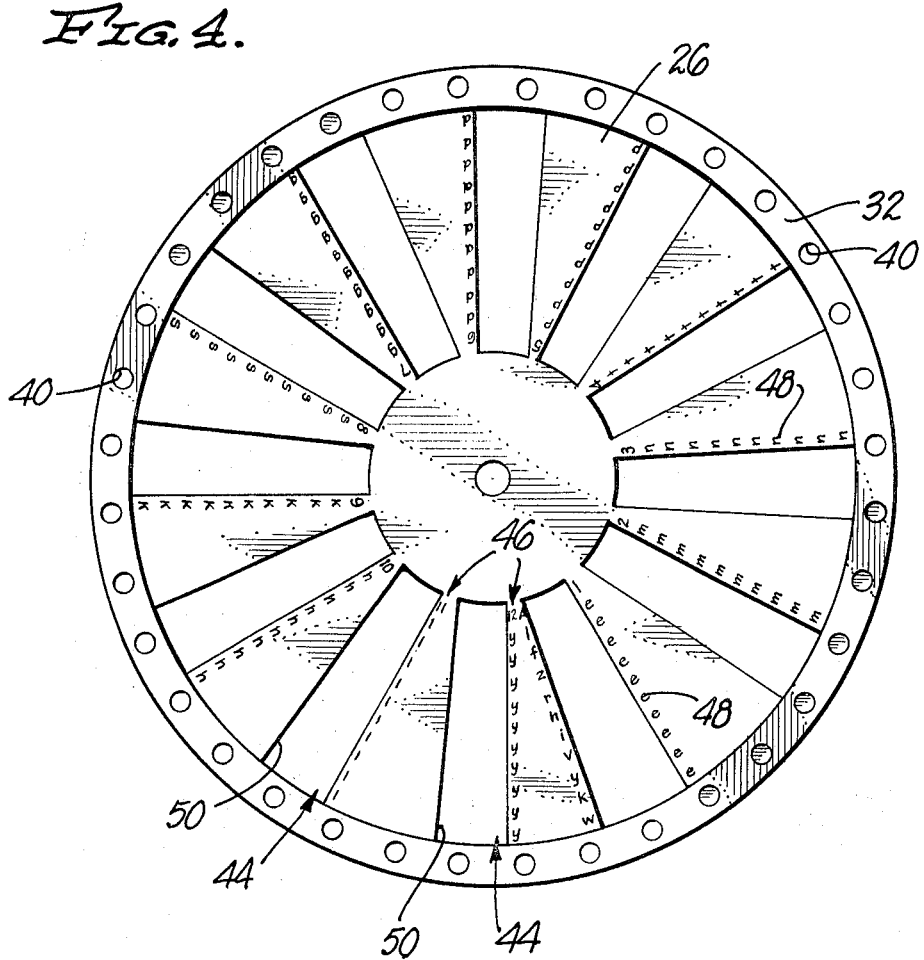
FIGS. 4–6 are face views of front, center and rear discs, respectively, of the teaching aid.
Figure 5:
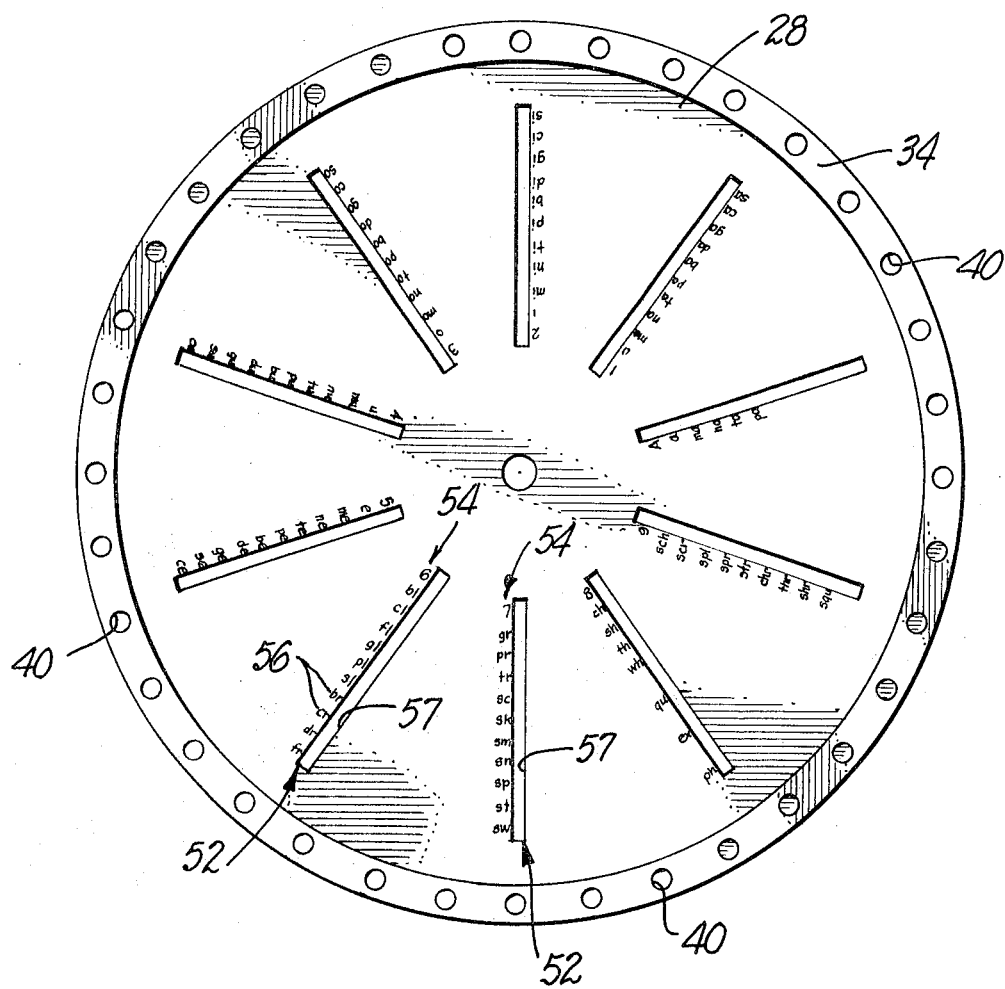
Figure 6:
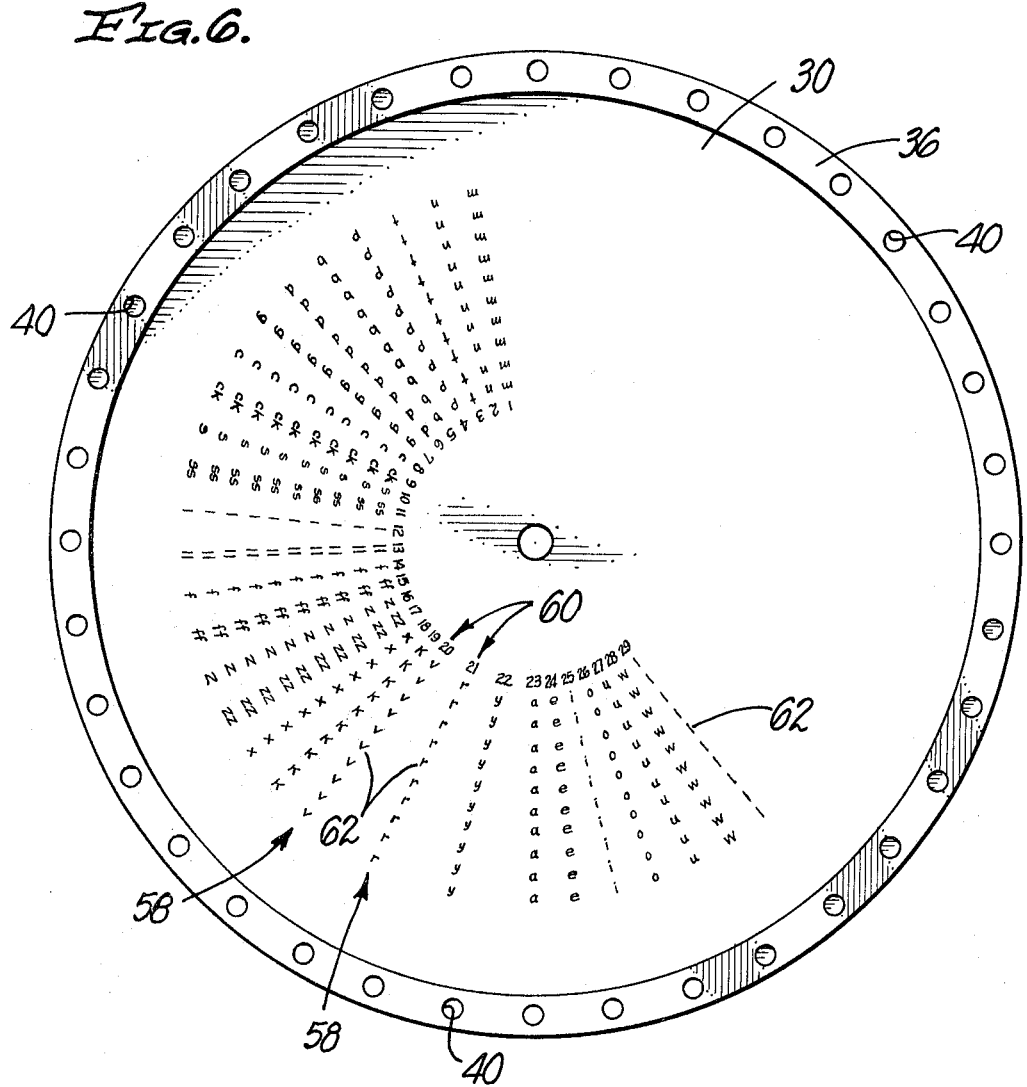

Discs 26, 28 and 30 have progressively larger diameters, as shown best in FIG. 2, such that edge portion or periphery of the center disc 28 projects beyond that of the front disc 26, and the edge portion or periphery of the rear disc 30 projects beyond that of the center disc. About the disc edge portions are forwardly projecting annular shoulders 32, 34 and 36 having coplanar front faces. Shoulder 32 of the front disc 26 fits closely about the face plate boss 16. Shoulder 34 of the center disc 28 fits closely about the front disc 26. Finally, shoulder 36 of the rear disc 30 fits closely about the center disc 28. These disc shoulders are exposed through openings 38 in the face plate 12 and have circumferentially spaced sockets 40 or the like to receive an implement, such as a pencil, for rotating the discs.

Face plate 12 has a window 42 in the form of a long narrow slot extending along and approximately bisected by a radius from the common rotation axis of the discs 26, 28, 30. The front disc 26 is rotatable relative to the face plate to a plurality of different, and substantially uniformly spaced angular positions to expose through the face plate window 42 different generally radial circumferentially spaced portions 44 of the front disc. Each disc portion 44 has a longitudinal row 46 of characters 48 and a window slot 50 along one side of and parallel to the respective character row.

Center disc 28 is rotatable relative to the front disc 26 to a plurality of different and substantially uniformly spaced angular positions to expose through each front disc window 50 different generally radial portions 52 of the center disc. Each center disc portion 52 has a longitudinal row 54 of characters 56 and a window slot 57 along one side of and parallel to the respective character row.

Rear disc 30 is rotatable relative to the center disc 28 to a plurality of different and substantially uniformly spaced angular positions to expose through each center disc window 57 different generally radial portions 58 of the rear disc. Each rear disc portion 58 has a longitudinal row 60 of characters 62.

A unique feature of the invention resides in the positions and orientations, relative to radii of the discs 26, 28, 30, of their character rows 46, 54, 60 and windows 50, 57. In this regard, it will be observed that each window 50 of the front disc 26 extends along a radius from the disc axis, and the adjacent character row 46 parallels and is laterally offset from the radius in the counterclockwise direction of the disc, as viewed from the front. Each window 57 of the center disc 28 extends along a radius from the disc axis, and the adjacent character row 54 parallels and is laterally offset from the radius in the clockwise direction of the disc, as viewed from the front. Finally, each character row 60 of the rear disc 30 extends along a radius from the disc axis. The corresponding characters 48, 56, 62 in the character rows are spaced equal distances from the disc axis.

From the above description, it is evident that the three discs 26, 28, 30 are selectively rotatable to their various angular positions in such a way as to expose through the windows 42, 50, 57 the character rows 46, 54, 60 in any selected combination. It will be observed in the drawings that width of the window slot 42 in the face plate 12 measured laterally of the radial centerline of the slot is just slightly larger than the combined width of the three widest character rows on the discs 26, 28 and 30 and that the lateral width of each window slot 50 in the first or front disc 26 is substantially greater than the width of the face plate slot. In addition, the character rows on each of the discs are spaced, as shown, such that the discs may be relatively angularly positioned to expose any three selected character rows on the discs or any pair of selected character rows on the disc, or any single character row on any one of the three discs. This feature of the invention provides substantial latitude in the phonetic combinations which may be exposed through the disc slots. The exposed character rows, as viewed through the face plate window 42, in the manner shown in FIG. 1, are disposed in side by side parallel relation with the rear disc character row 60 between the front and center disc character rows 46, 54. The center row is located on a radius from the axis of the discs, and the outer rows are located at opposite sides of the center row in parallel laterally offset relation to the radius. The corresponding characters 48, 56, 62 in the exposed character rows are aligned laterally of the rows to form various character combinations which are readable laterally of the rows. As noted earlier, the illustrated teaching aid is a phonetic teaching aid. The characters 48, 56, 62 are vowels and consonants for forming a variety of phonetic combinations or letter groups which may have one, two, three or four letters.

It will be understood by those versed in the art that the illustrated phonics teaching aid may employ a variety of letter arrangements on the discs 26, 28, 30. The drawing illustrates the preferred letter arrangement. Referring to the illustrated teaching aid, center disc 28 is the main disc. Column A on this disc, the introductory column, presents the vowel *a*, then *ma, na, pa,* and *ta*. The next five columns present the vowels one at a time, in combination with nine consonants. Column 6, 7, 8 present two consonant initial blends, column 9, three consonant blends.

Rear disc 30 has twenty columns of consonants, including five double ones, which can be added to columns four through five of disc 28 to form three letter words and syllables.

Front disc 26, column A, presents a column of ten other consonants which can be superimposed on the initial consonants of columns A through 5 of disc 28 to form more three letter words.

Disc 26, column 1, presents *e*'s which can be added to the three letter words formed by discs 28 and 30 to create final *e* words.

Disc 26, columns 2 through 7, 9 through 11, present consonants which can be added to three letter words to make four letter, final blend words. Column 8 can be added to form plurals.

Disc 30, column 21, is a row of *r*'s to form vowel/*r* words and syllables.

Disc 30, column 22, is a row of *y*'s which can be added to columns 1, 3 and 5 of disc 28 to form *ay, oy,* and *ey* words, or to columns 6, 7, 8 and 9 to form initial blend final *y* words, like fly and shy.

Disc 30, columns 23 to 27, present the 5 vowels. These can be added to columns A through 5 of disc 28 to form the double vowels — *ai, ee, ea, oa, ui, ue, ei, ou, au, oo, oi,* to which columns 2 through 11 of disc 26 can be added to form words and syllables.

Columns 28 and 29 of disc 30 can be added to columns 1 of disc 28 to form *aw*/ all words, column 28 to column 3 to form *ow* words.

The present teaching aid has many advantages. Among the foremost of these are the following:

It is a very simple, compact device, yet it presents over 10,000 usable letter combinations.

The discs are covered so that no more than three columns of letters are exposed at a time, eliminating distractions and the possibility of overwhelming the user, particularly the student with figure/ground relationship problems.

It is a manipulative device which will attract and hold the attention of many students.

It is complete, eliminating the need for cumbersome cards and charts or expensive seatwork books.

It provides extensive practice in all or any specific areas of phonics, can also be used to teach proper articulation to children with speech problems.

It is an individualized program which gives no indication of age or grade level. It can be used for any student of any age and in any situation where reading is taught, i.e., at home, or at school, in regular, special, or adult classes.

It is an audio/visual approach, not a paper and pencil one. The user listens to a teacher on tape, repeats what he hears.

Since the arrangement of letters is fixed, it is possible to incorporate a carefully planned program into the device, a program based on sound educational psychology.

Letters are not introduced alphabetically, but in relation to the ease with which they can be learned and the frequency with which they are used.

Letters which present problems are presented so as to minimize these problems or to emphasize them when this will facilitate learning them.

Letters are introduced so that they form words from the beginning and so that each added letter compounds the number of words the student learns.

It permits the presentation of initial consonant/vowel combinations to which are added consonants. This facilitates word synthesis, left to right progression, and the development of a sight vocabulary.

Both words and syllables are formed, enabling the student to sound by syllables and figuring out multisyllable words.

Because letters are presented in numbered columns of 10 letters each, it is easy to make assignments. It can be set at a given place and the student directed to do a given number of rows.

This also makes it easy to coordinate tapes or records with it.

These rows of 10 letters provide practice for fluency since the user does not need to change columns often, can do so rapidly, if necessary.

What is claimed as new in support of Letters Patent is:

1. A teaching aid comprising:
   a face plate,
   a plurality of concentric discs behind said face plate disposed in close face to face relation to one another and to said face plate and including at least a first front disc adjacent the face plate and a second disc behind said first disc,
   pivot means joining said face plate and discs for independent rotation of said discs relative to one another and to said face plate about the common axis of the discs,
   said face plate having window means within a relatively long and narrow portion of said face plate extending generally radially from said axis,
   said first disc being rotatable to a plurality of different angular positions relative to said face plate to expose different generally radial portions of said first disc through said window means and having within each said disc portion a longitudinal row of characters and window means along one side of and parallel to the character row,
   said second disc being rotatable to a plurality of different angular positions relative to said first disc to expose different generally radial portions of said second disc through said window means of said first disc and having within each said second disc portion a longitudinal row of characters;
   the width of said face plate window means measure laterally of the radial centerline of the latter window means being at least equal to the combined width of the two widest character rows on said discs, the lateral width of each window means in said first disc being substantially greater than the width of said face plate window means, and the character rows on each disc being spaced such that said discs may be relatively angularly positioned to expose any pair of selected character rows or the discs or any selected single character row on either disc to said window means with the two rows of each exposed character row being disposed in side by side parallel relation,
   the characters in the character rows being located in corresponding positions along the rows, such that the characters in the exposed character rows are aligned laterally of the rows, and the exposed characters being arranged to be read laterally of the exposed character rows.

2. A teaching aid according to claim 1 wherein:
   each said second disc portion has window means along one side of the corresponding character row,
   said discs include a third disc behind said second disc, and
   said third disc is rotatable to a plurality of different angular positions relative to said second disc to expose different generally radial portions of said third disc through said second disc window means and has within each said third disc portion a longitudinal row of characters, whereby the three discs are angularly positionable to expose any selected character rows of the discs through said window means; and
   the width of said face plate window means being at least equal to the combined width of the three widest character rows on said discs, whereby said discs may be angularly positioned to expose any three selected character rows on the discs, or any pair of selected character rows on the discs, or any selected single character row on any one of the discs.

3. A teaching aid according to claim 1 wherein:
   said teaching aid is a phonics teaching aid,
   said characters are vowels and consonants arranged for exposure through said window means in various preselected phonetic combinations.

4. A teaching aid according to claim 1 including:
   a back plate behind the rearmost disc rotatably secured to said face plate and discs, said back plate having a forwardly projecting annular flange concentric with and circumferentially surrounding said discs and face plate and defining with said face plate a substantially enclosed space containing said discs,
   said discs have progressively larger diameters from said front disc to the rearmost disc, and
   said face plate has an opening through which the disc edge portions are exposed for rotation of the discs.

5. A teaching aid according to claim 2 wherein:
   said face plate and discs are opaque and said window means comprise long narrow slots;
   said teaching aid is a phonetics teaching aid,
   said characters are vowels and consonants arranged for exposure through said window means in various pre-selected phonetic combinations,
   a back plate behind the rearmost disc rotatably secured to said face plate and discs, said back plate having a forwardly projecting annular flange concentric with and circumferentially surrounding said discs and face plate and defining with said face plate a substantially enclosed space containing said discs,
   said discs having progressively larger diameters from said front disc to the rearmost disc, and
   said face plate has an opening through which the disc edge portions are exposed for rotation of the discs.

* * * * *